(12) United States Patent
Takeshita et al.

(10) Patent No.: US 8,039,064 B2
(45) Date of Patent: Oct. 18, 2011

(54) COMPOUND, POLYMERIZABLE LIQUID CRYSTAL COMPOSITION, OPTICAL ELEMENT AND OPTICAL INFORMATION WRITING/READING DEVICE

(75) Inventors: Nobuhiko Takeshita, Koriyama (JP); Teppei Konishi, Koriyama (JP); Hiroshi Kumai, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/952,430

(22) Filed: Nov. 23, 2010

(65) Prior Publication Data
US 2011/0063966 A1 Mar. 17, 2011

Related U.S. Application Data

(63) Continuation of application No. PCT/JP2009/059905, filed on May 29, 2009.

(30) Foreign Application Priority Data

May 30, 2008 (JP) ................................. 2008-142147

(51) Int. Cl.
C09K 19/30 (2006.01)
C09K 19/20 (2006.01)
C09K 19/38 (2006.01)
C07C 67/08 (2006.01)
C07C 69/76 (2006.01)
G02B 5/18 (2006.01)
G11B 7/135 (2006.01)

(52) U.S. Cl. ............... 428/1.1; 252/299.63; 252/299.67; 349/2; 560/76; 369/100; 369/112.01

(58) Field of Classification Search ............. 252/299.63, 252/299.67; 349/2; 428/1.1; 560/76; 369/100, 369/112.01
See application file for complete search history.

(56) References Cited

U.S. PATENT DOCUMENTS

| | | | | |
|---|---|---|---|---|
| 7,081,281 B2 * | 7/2006 | Kumai et al. | .................. | 428/1.1 |
| 7,371,438 B2 * | 5/2008 | Kaida et al. | ..................... | 428/1.1 |
| 7,442,418 B2 * | 10/2008 | Kaida et al. | ..................... | 428/1.1 |
| 7,534,370 B2 * | 5/2009 | Yoshida et al. | .......... | 252/299.62 |
| 7,618,690 B2 * | 11/2009 | Nagayama et al. | ............. | 428/1.1 |
| 7,820,250 B2 * | 10/2010 | Yoshida et al. | ................. | 428/1.1 |
| 7,846,515 B2 * | 12/2010 | Yoshida et al. | ................. | 428/1.1 |
| 2007/0104894 A1 | 5/2007 | Kaida et al. | | |
| 2009/0128769 A1 * | 5/2009 | Shioya et al. | .................. | 349/183 |

FOREIGN PATENT DOCUMENTS

| | | |
|---|---|---|
| JP | 2001-220583 | 8/2001 |
| JP | 2004-263037 | 9/2004 |
| JP | 2006-219533 | 8/2006 |
| WO | 2006/001096 | 1/2006 |
| WO | WO 2007055425 A1 * | 5/2007 |

OTHER PUBLICATIONS

International Search Report issued Aug. 18, 2009 in PCT/JP09/059905 filed May 29, 2009.

* cited by examiner

*Primary Examiner* — Shean Wu
(74) *Attorney, Agent, or Firm* — Oblon, Spivak, McClelland, Maier & Neustadt, L.L.P.

(57) ABSTRACT

A compound having a good durability against light and capable of producing desired liquid crystallinity after polymerization, and a polymerizable liquid crystal composition containing such a compound, are provided. Further, an optical element having a good durability against light, and an optical information writing/reading device employing such an element, are provided.

A compound represented by $CH_2=CR^1-COO-R^2-Cy-Ph-R^3-OCO-CR^4=CH_2$. $R^1$ and $R^4$ are each preferably a hydrogen atom. $R^3$ is preferably a $C_{1-6}$ alkylene group wherein an oxygen atom is present or not present at an end of the group to be bonded to a cyclic group, and wherein some or all of hydrogen atoms bonded to carbon atoms in the group may be substituted by fluorine atoms; or an alkylene group wherein an oxygen atom is present at an end of the group to be bonded to a cyclic group. A diffraction grating 2 produced by employing this liquid crystal compound has a good durability against light, and accordingly, it is possible to constitute an optical information writing/reading device suitable for large capacity recording by employing a blue laser as a light source 1.

8 Claims, 1 Drawing Sheet

COMPOUND, POLYMERIZABLE LIQUID CRYSTAL COMPOSITION, OPTICAL ELEMENT AND OPTICAL INFORMATION WRITING/READING DEVICE

TECHNICAL FIELD

The present invention relates to a compound a polymerizable liquid crystal composition, an optical element and an optical writing/reading device.

BACKGROUND ART

On a surface of an optical disk such as a CD (compact disk) or a DVD (digital versatile disk), concaves and convexes called as pits are provided. An optical head device is a device for radiating a laser beam to an optical disk and detecting light reflected from the disk to read an information recorded in the pits.

For example, linearly polarized light emitted from a light source is transmitted through a beam splitter, a collimator lens, a phase difference plate and an objective lens to reach an information recording plane of an optical disk. In this outgoing path, the linearly polarized light is straightly transmitted through the beam splitter and transformed into circularly polarized light by the phase difference plate. The circularly polarized light is reflected by the information recording plane of the optical disk to be circularly polarized light in the reverse direction, and is transmitted through the objective lens, the phase difference plate and the collimator lens in the returning path in the reverse order to the order of the outgoing path. In the returning path, the light is transformed by the phase difference plate into linearly polarized light polarized in a direction perpendicular to that of incident light. Accordingly, light in the returning path is linearly polarized in a direction 90° different from that of the light in the outgoing path, whereby the propagation direction of the light is turned by 90° by the beam splitter and the light reach a photodetector.

In the optical head device, if e.g. fluctuation of tilt of the optical disk occurs, the focal position of beam spot deviates from the recording surface. Accordingly, a servo mechanism for detecting and compensating such a deviation to make the beam spot follow the concave/convex pits in the recording surface. Such a mechanism is configured to adjust the focus of the beam spot emitted from a laser light source on the recording surface to detect a tracking position, so that the beam spot follows an objective track. Further, in the optical head device, it is necessary to prevent a laser beam reflected by the recording surface without hitting the pits from returning to the light source.

For these reasons, the optical head device requires an optical element for modulating (polarizing, diffracting, phase-adjusting, etc.) the laser beam from the light source. For example, the above phase difference plate has a function of effecting different refractive index depending on the angle between the optical axis of the phase difference plate and the phase plane of incident light, and shifting the phases of the two components of light produced by birefringence. The two light components having phases shifted from each other are synthesized when the light is output from the phase difference plate. The magnitude of the shift of the phase is determined by the thickness of the phase difference plate. Accordingly, by adjusting the thickness, a quarter wavelength plate for shifting the phase by $\pi/2$, a half wavelength plate for shifting the phase by $\pi$, etc. can be produced. For example, linearly polarized light passed through a quarter wavelength plate becomes circularly polarized light, but linearly polarized light passed through a half wavelength plate becomes linearly polarized light having a polarization plane tilted by 90°. By using such a characteristic and combining a plurality of optical elements, the above servo mechanism can be constructed. Further, the above optical element is employed also for preventing a laser beam reflected by the recording surface without hitting pits from returning to the light source.

The above optical element can be produced by employing a liquid crystal material. For example, a liquid crystal molecule having a polymerizable functional group has both a characteristic of polymerizable monomer and a characteristic of liquid crystal. Accordingly, when such liquid crystal molecules each having a polymerizable functional group are aligned and polymerized, an optically anisotropic material wherein alignment of the liquid crystal molecules are fixed can be obtained. Such an optically anisotropic material has an optical anisotropy such as a refractive index anisotropy derivable from a mesogenic structure, and by using this characteristic, a diffraction element or a phase difference plate is produced. As such an optically anisotropic material, for example, Patent Document 1 discloses a polymer liquid crystal obtained by polymerizing a liquid crystal composition containing a compound represented by $CH_2=CH-COO-Ph-OCO-Cy-Z$ (Z: alkyl group) Further, Patent Document 2 discloses a liquid crystal composition containing a monomer having a polymerizable functional group and a mesogenic structure.

By the way, the above optical element will be commonly required to have the following characteristics.

1) The optical element has an appropriate retardation value (Rd value) depending on wavelength to be used and application of the element.

2) Optical characteristics (Rd value, transmittance, etc.) are uniform in the entire surface of the optical element.

3) There is little scattering or absorption at the wavelength to be used.

4) Optical characteristics of the optical element can be easily adjusted to those of other materials constituting the element.

5) Wavelength dispersion of the refractive index or the refractive index anisotropy is small at wavelength to be used.

Particularly, it is important to have a proper Rd value indicated in item 1). Here, Rd value is a value defined by a formula $Rd=\Delta n \times d$ where $\Delta n$ is a refractive index anisotropy and d is the thickness of the optical element in the propagation direction of light. In order to obtain a desired Rd value, if $\Delta n$ of a liquid crystal material forming the optical element is small, it is necessary to increase the thickness d. However, if the thickness d increases, it becomes difficult to align the liquid crystal molecules, whereby it becomes difficult to obtain a desired optical characteristic. On the other hand, if $\Delta n$ is large, it is necessary to decrease the thickness d, and in this case, it becomes difficult to precisely control the thickness. Accordingly, it is extremely important for such a liquid crystal material to have a proper $\Delta n$ value.

In recent years, in order to increase the capacity of optical disks, use of laser beam having a shorter wavelength for writing or reading of an information has been in progress to reduce the concave/convex pit size of optical disks. For example, a laser beam having a wavelength of 780 nm is used for CDs, a laser beam having a wavelength of 650 nm is used for DVDs, and a laser beam having a wavelength of 405 nm is used for BDs (Blu-ray Disk) or HDDVDs (High-Difinition Digital Versetile Disk). In next-generation recording media, still shorter wavelength may be used, and use of a laser beam (hereinafter it is also referred to as blue laser beam) having a wavelength of from 300 to 450 nm, tends to increase from now on. However, the polymer liquid crystals described in Patent Document 1 and Patent Document 2 are insufficient in the durability against blue laser beam.

For example, when a phase difference plate prepared by employing such a liquid crystal is disposed in an optical head device using a blue laser beam as a light source, aberration is generated in the lapse of time in some cases. This is considered to be because the material of the phase different plate is damaged by exposure to the blue laser beam. If such an aberration is generated, light (light flux) emitted from the light source and transmitted through a collimator lens, a phase difference plate and an objective lens, cannot be focused into a point when it reaches a surface of a recording medium. As a result, light-utilization efficiency decreases and efficiency of reading or writing of an information decreases.

By the way, in order to reduce the size and increase the efficiency of an optical element, it is usually necessary to use a material having a high refractive index anisotropy. In general, a material having a high refractive index anisotropy has a high refractive index. However, since such a high refractive index material has a large wavelength dispersion of refractive index, such a material tends to have a high absorption of short wavelength light (that is, such a material has a high molar extinction coefficient). Accordingly, conventional high refractive index materials have a problem that they have low durability against short wavelength light such as a blue laser beam.

In order to improve durability against light, it is preferred to employ a material having a low molar extinction coefficient such as a compound having a complete alicyclic structure containing no aromatic ring. However, a complete alicyclic liquid crystal monomer usually has a small Δn, and there are problems that a polymer obtained from such a monomer has a further small Δn or such a polymer becomes isotropic, whereby it becomes difficult to obtain a desired liquid crystallinity.

For example, the following two complete alicyclic liquid crystal monomers exhibit optical anisotropy (birefringence), but form an isotropic polymer by polymerization.

PRIOR ART

Patent Documents

Patent Document 1: JP-A-2004-263037
Patent Document 2: JP-A-2001-220583

DISCLOSURE OF THE INVENTION

Problems to be Solved by the Invention

The present invention has been made considering the above problems. Namely, an optical element for modulating a laser beam having an wavelength of from 300 nm to 450 nm, is required to employ an optically anisotropic material which shows little degradation even if it is exposed to light in this wavelength band and excellent in the durability, and which is also excellent in liquid crystallinity. For such an anisotropic material, the structure of a compound to be employed for a liquid crystal composition is extremely important. Under the circumstances, it is an object of the present invention to provide a compound which has a good durability against blue laser beam and which has a crosslinking property suitable to be contained in a liquid crystal composition that shows a desired liquid crystallinity after polymerization; and a polymerizable liquid crystal composition containing such a compound.

Further, it is an object of the present invention to provide an optical element having a good durability against a blue laser beam, and an optical information writing/reading device employing such an optical element.

Other objects and merits of the present invention will be clarified from the following descriptions.

Means for Solving the Problems

A first embodiment of the present invention relates to a compound represented by the following formula (1):

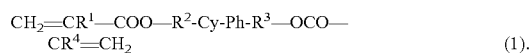
(1).

In formula (1), $R^1$ and $R^4$ are each independently represents a hydrogen atom or a methyl group. $R^2$ represents a single bond or a $C_{1-15}$ hydrocarbon group wherein an oxygen atom is present at an end of the group to be bonded to a cyclic group. $R^3$ represents a $C_{1-15}$ alkylene group wherein an oxygen atom is present or not present at an end of the group to be bonded to a cyclic group. Except in a case where $R^2$ is a single bond, $R^2$ and/or $R^3$ may each independently have an etheric oxygen atom in a carbon-carbon bond in the alkylene group, and some or all of hydrogen atoms bonded to carbon atoms of the group may be substituted by fluorine atoms. Cy represents a trans-1,4-cyclohexylene group wherein hydrogen atoms bonded to carbon atoms in the group may be each independently substituted by a fluorine atom, a chlorine atom or a methyl group. Ph represents a 1,4-phenylene group wherein hydrogen atoms bonded to carbon atoms in the group may be each independently substituted by a fluorine atom, a chlorine atom or a methyl group.

In the first embodiment of the present invention, $R^2$ is preferably a single bond.

In the first embodiment of the present invention, it is preferred that $R^1$ and $R^4$ are each a hydrogen atom; and $R^3$ is an alkylene group wherein some or all of hydrogen atoms bonded to carbon atoms in the alkylene group may be substituted by fluorine atoms, or an alkylene group wherein an oxygen atom is present at an end of the group to be bonded to a cyclic group.

A second embodiment of the present invention relates to a polymerizable liquid crystal composition containing the compound of the first embodiment of the present invention and a polymerizable liquid crystal compound other than the compound.

In the second embodiment of the present invention, the composition may contain from 1 mass % to 30 mass % of the compound of the first embodiment of the present invention, and may contain from 1 mass % to 30 mass % in total of all crosslinking compounds including other crosslinking compounds, and the composition may contain from 70 mass % to 99 mass % of the non-crosslinking compound represented by the following formula (2):

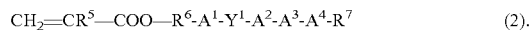
(2).

In formula (2), $R^5$ represents a hydrogen atom or a methyl group,
$R^6$ represents a single bond or a $C_{1-15}$ alkylene group, and when $R^6$ is an alkylene group, an etheric oxygen atom may be present independently in a carbon-carbon bond of the alkylene group or at an end of the group to be bonded to a cyclic group, and some or all of hydrogen atoms bonded to carbon atoms of the group may be substituted by fluorine atoms.

$R^7$ is a $C_{1-12}$ alkyl group, a $C_{1-12}$ alkoxy group, a $C_{1-12}$ alkylcarbonyloxy group or a fluorine atom, and when $R^7$ is an alkyl group, an alkoxy group or an alkylcarbonyloxy group, some or all hydrogen atoms bonded to carbon atoms in the group may be substituted by fluorine atoms.

$Y^1$ represents a single bond or —COO—.

$A^1$, $A^2$, $A^3$ and $A^4$ each independently represents a single bond, a trans-1,4-cyclohexylene group or a 1,4-phenylene group, at most two of $A^1$, $A^2$, $A^3$ and $A^4$ represent single bonds, at least one of them represents a trans-1,4-cyclohexylene group, there is no three continuous 1,4-phenylene groups, and some or all of hydrogen atoms of the trans-1,4-cyclohexylene group or the 1,4-phenylene group may be substituted by fluorine atoms.

The third embodiment of the present invention relates to an optical element employing a polymer liquid crystal obtained by polymerizing the polymerizable liquid crystal composition of the second embodiment of the present invention.

The fourth embodiment of the present invention relates to an optical writing/reading device for recording an information in an optical recording medium and/or for reading an information recorded in an information recording medium, which employs the optical element of the third embodiment of the present invention.

EFFECTS OF THE INVENTION

By the first embodiment of the present invention, it is possible to obtain a compound having a good durability against a blue laser beam and a good compatibility, which provides a proper Rd value when it is used as a polymerizable liquid crystal composition.

By the second embodiment of the present invention, it is possible to obtain a polymerizable liquid crystal composition which provides a desired liquid crystallinity by polymerization.

By the third embodiment of the present invention, it is possible to obtain an optical element having a good durability against a blue laser beam.

By the fourth embodiment of the present invention, it is possible to obtain an optical information writing/reading device suitable for large capacity medium.

MODE FOR CARRYING OUT THE INVENTION

Figure 1:
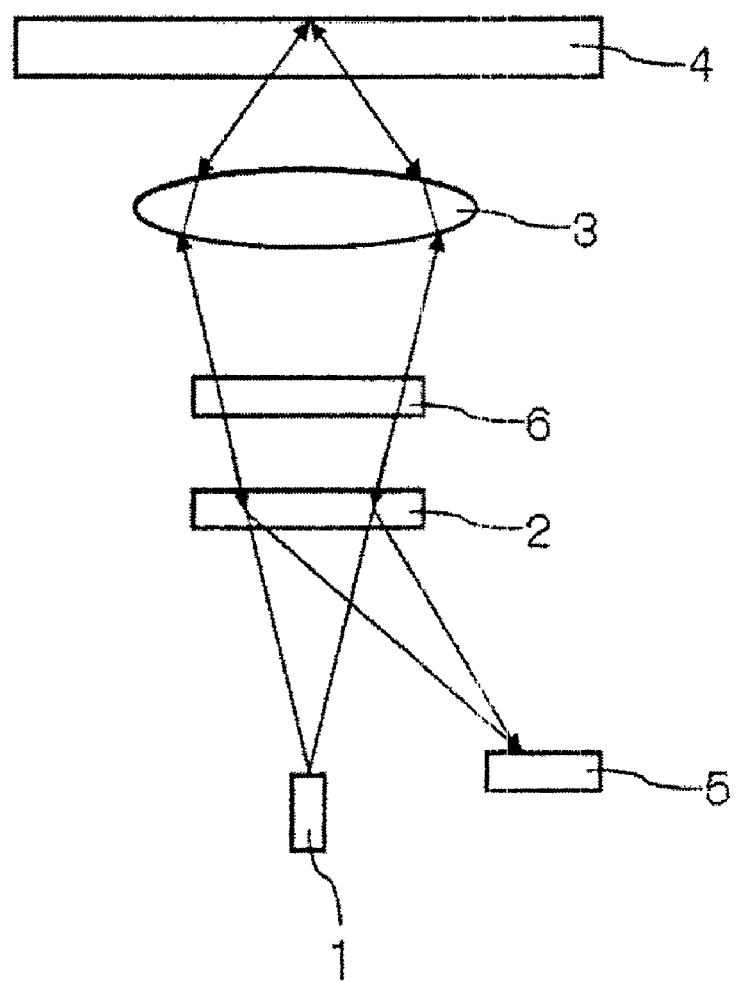
FIG. 1 is an example of construction view of an optical writing/reading device of the present invention.

Present inventors have conducted extensive studies, and as a result, they have discovered that by employing a multifunctional compound represented by formula (1), it is possible to improve durability against a blue laser beam and improve the compatibility and to obtain a desired liquid crystallinity after polymerization of a polymerizable liquid crystal composition employing such a composition.

$$CH_2=CR^1-COO-R^2-Cy-Ph-R^3-OCO-CR^4=CH_2 \quad (1)$$

In formula (1), $R^1$ and $R^4$ are each independently represents a hydrogen atom or a methyl group. $R^2$ represents a single bond or an alkylene group wherein an oxygen atom is present at an end of the group to be bonded with a cyclic group. The number of carbon atoms in the alkylene group is preferably within a range of from 1 to 15 considering the linearity of molecules after polymerization. Particularly, from the viewpoint of facilitating polymerization, the number of carbon atoms is preferably from 3 to 10.

$R^3$ represents a $C_{1-15}$ alkylene group wherein an oxygen atom is present or not present at an end of the group to be bonded with a cyclic group. Except in a case where $R^2$ is a single bond, $R^2$ and/or $R^3$ may each independently have an etheric oxygen atom in a carbon-carbon bond in the alkylene group, and some or all of hydrogen atoms bonded to carbon atoms of the group may be substituted by fluorine atoms.

Cy represents a trans-1,4-cyclohexylene group wherein hydrogen atoms bonded to carbon atoms in the group may be each independently substituted by a fluorine atom, a chlorine atom or a methyl group. Ph represents a 1,4-phenylene group wherein hydrogen atoms bonded to carbon atoms in the group may be each independently substituted by a fluorine atom, a chlorine atom or a methyl group.

As shown in the formula (1), in the compound of the present invention, a cyclohexylene ring is directly bonded to a benzene ring. Such a structure is designed considering that, in general, multifunctional crosslinking compounds do not tend to exhibit liquid crystallinity after they are polymerized. Namely, since a phenyl group or a cyclohexylene group is a group producing liquid crystallinity, these groups are directly bonded to obtain a structure having a linearity and a high compatibility with a compound tending to exhibit a liquid crystallinity or with a liquid crystal compound.

Further, the compound of the present invention is designed to have no resonance structure. For example, since structures —COO-Ph-, —OCO-Ph-, Ph-Ph-, etc. are resonance structures, if any of these structures is present in a molecule, the absorption band shifts to longer wavelength side to decrease durability against light. By thus designing a molecule so as to have no resonance structure, it is possible to improve the durability against light and to achieve a good durability also against a blue laser.

In the compound of the present invention, $R^1$ and $R^4$ are each preferably a hydrogen atom. This is because if a high bulk molecule is present in the vicinity of a functional group, polymerization becomes difficult. Further, $R^3$ is preferably an alkylene group wherein some or all hydrogen atoms bonded to carbon atoms may be substituted by fluorine atoms; or an alkylene group wherein an oxygen atom is present at an end of the group bonded with a cyclic group. By such a structure, it becomes easy to control the melting point, the phase transition temperature ($T_c$) and the compatibility, etc. Further, by changing the number of alkylene groups, it is possible to change the molecule length. In a case of preparing a polymerizable liquid crystal composition by employing the compound of the present invention, it is possible to increase crosslinking density and to further improve durability against light by making the molecule length of the compound of the present invention be agree with molecule lengths of other polymerizable liquid crystal compounds to be mixed.

As the compound of the present invention, the following compounds may, for example, be mentioned:

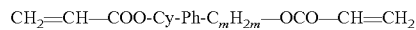

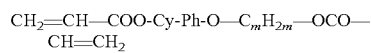

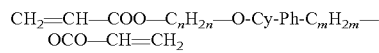

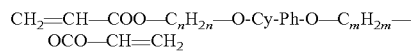

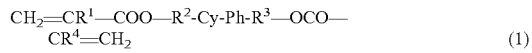

In each of the above compounds, an oxygen atom of an ether bond or an ester bond is bonded to a trans-1,4-cyclohexylene group. Since such a structure improves flexibility, more crosslinkage at a time of polymerization tends to occur as compared with, for example, a compound represented by the following formula. Here, a construction wherein an ether bond is bonded to a 1,4-phenylene group has the same characteristics.

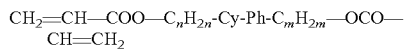

$CH_2{=}CH{-}COO{-}C_nH_{2n}{-}Cy{-}Ph{-}C_mH_{2m}{-}OCO{-}CH{=}CH_2$

The compound of the present invention is mixed with other polymerizable compounds to form a polymerizable liquid crystal composition. Such a polymerizable liquid crystal composition preferably contains from 1 to 30 mass % in total of all crosslinkable compounds including other crosslinkable compounds and from 1 to 30 mass % of the compound of the present invention, and from 70 to 99 mass % of non-crosslinkable compound represented by the following formula (2). Here, in order to further increase the effect of the present invention, at least a half in terms of mass % of the crosslinkable compounds is the compound of the present invention. Further, the polymerizable liquid crystal composition preferably contains the compound of the present invention in an amount of from 5 to 30 mass %, particularly preferably from 10 to 30 mass %.

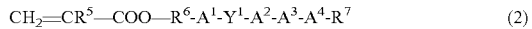

$CH_2{=}CR^5{-}COO{-}R^6{-}A^1{-}Y^1{-}A^2{-}A^3{-}A^4{-}R^7$ (2)

In formula (2), $R^5$ represents a hydrogen atom or a methyl group.

$R^6$ represents a single bond or $C_{1-15}$ alkylene group, and when $R^6$ is an alkylene group, an etheric oxygen atom may be present independently in a carbon-carbon bond of the alkylene group or at an end of the group to be bonded with a cyclic group, and some or all of hydrogen atoms bonded to carbon atoms of the group may be substituted by fluorine atoms.

$R^7$ is a $C_{1-12}$ alkyl group, a $C_{1-12}$ alkoxy group, a $C_{1-12}$ alkylcarbonyloxy group or a fluorine atom, and when $R^7$ is an alkyl group, an alkoxy group or an alkylcarbonyloxy group, some or all hydrogen atoms bonded to carbon atoms in the group may be substituted by fluorine atoms.

$Y^1$ represents a single bond or —COO—.

$A^1$, $A^2$, $A^3$ and $A^4$ each independently represents a single bond, a trans-1,4-cyclohexylene group or a 1,4-phenylene group; at most two of $A^1$, $A^2$, $A^3$ and $A^4$ represent single bonds, at least one of them represents a trans-1,4-cyclohexylene group, there is no three continuous 1,4-phenylene groups, and some or all of hydrogen groups of the trans-1,4-cyclohexylene group or the 1,4-phenylene group may be substituted by fluorine atoms.

Crosslinkable compounds other than the compound of the present invention, may be a compound having a structure similar to that of the compound of the present invention and showing liquid crystallinity or being excellent in compatibility with liquid crystal, which is a compound having at least two polymerizable functional groups and which does not deteriorate the characteristics of the present invention. Specifically, a compound represented by the following formula (3) is mentioned.

$CH_2{=}CR^8{-}COO{-}R^9{-}A^5{-}Y^2{-}A^6{-}Y^3{-}A^7{-}Y^4{-}A^8{-}R^{10}{-}OCO{-}CR^{11}{=}CH_2$ (3)

In formula (3), $R^8$ and $R^{11}$ each independently represents a hydrogen atom or a methyl group.

$R^9$ and $R^{10}$ each independently represents a single bond or a $C_{1-15}$ alkylene group, and such an alkylene group may independently have an oxygen atom in a carbon-carbon bond or at an end of the group to be bonded to a cyclic group.

further, some or all of hydrogen atoms bonded to carbon atoms in the alkylene group may be substituted by fluorine atoms.

$Y^2$ represents a single bond or —COO—, and $Y^4$ represents a single bond or —OCO—

$Y^3$ represents a single bond or —$CH_2$—$CH_2$—.

$A^5$, $A^6$, $A^7$ and $A^8$ each independently represents a single bond, a trans-1,4-cyclohexylene group or a 1,4-phenylene group, at most two of $A^1$, $A^2$, $A^3$ and $A^4$, represent single bonds, at least one of them is a trans-1,4-cyclohexylene group, there is no three continuous 1,4-phenylene groups, and some or all of hydrogen atoms of the trans-1,4-cyclohexylene group or 1,4-phenylene group may be substituted by fluorine atoms.

In the above polymerizable liquid crystal composition, the molecular length of the crosslinkable compound and the molecular length of the non-crosslinkable compound are preferably about the same. By such a construction, it is possible to increase Δn after polymerization to make it easy to maintain liquid crystallinity.

Here, the polymerizable liquid crystal composition of the present invention may contain an additive such as a photopolymerization initiator, an antioxidant or a colorant.

Next, an example of obtaining a polymer liquid crystal by polymerizing the polymerizable liquid crystal composition of the present invention, will be described.

The polymer liquid crystal is obtained by polymerizing the above-mentioned polymerizable liquid crystal composition in a state that the liquid crystal composition shows liquid crystallinity and that the liquid crystal is aligned.

The state that the liquid crystal composition shows liquid crystallinity, can be maintained by making the ambient temperature at most the nematic phase-isotropic phase transition temperature ($T_c$). However, since Δn of the liquid crystal composition is extremely small at a temperature close to $T_c$, the upper limit of the ambient temperature is preferably at most ($T_c$-10).

As the polymerization method, photopolymerization or thermopolymerization may be mentioned. From the viewpoint of easiness of maintaining liquid crystallinity or easiness of curing, photopolymerization is preferred. As light to be used for photopolymerization, UV rays or visible light is preferred. In a case of carrying out photopolymerization, a photopolymerization initiator is preferably employed, and in particular, such a photopolymerization initiator is preferably one appropriately selected from the group consisting of an acetophenone, a benzophenone, a benzoin, a benzyl, a Michler ketone, a benzoin alkyl ether, a benzyl dimethyl ketal and a thioxanthone. One or at least two types of photopolymerization initiators may be used in combination. The amount of photopolymerization initiator based on the total amount of the polymerizable liquid crystal composition is preferably from 0.01 to 5 mass %, particularly preferably from 0.01 to 2 mass %.

The polymer liquid crystal can be obtained by polymerizing the above-mentioned polymerizable liquid crystal composition in a state that it is sandwiched between a pair of substrates having a surface on which an alignment treatment is applied. Specific examples will be described as follows.

First, a transparent substrate is prepared. As the transparent substrate, for example, a substrate made of a material having a high transmittance for visible light may be employed. Specifically, it may be a substrate made of an inorganic glass such as an alkaline glass, a non-alkaline glass or a quartz glass; or a transparent resin such as polyester, polycarbonate, polyether, polysulfone, polyether sulfone, polyvinyl alcohol or a fluoropolymer such as a polyvinyl fluoride. From the viewpoint of high rigidity, a substrate made of an inorganic glass is preferably employed. The thickness of the transparent substrate is not particularly limited, and usually, it may be from 0.2 to 1.5 mm, preferably from 0.3 to 1.1 mm. The transparent substrate may be provided with a surface treatment layer made of an inorganic material or an organic material for the purpose of preventing alkaline elusion, improving adhesiveness, preventing reflection or obtaining a hard coat function.

Next, an alignment treatment is applied to a surface of the transparent substrate. For example, an alignment film is formed on the transparent substrate, and an alignment treatment is applied to the alignment film. The alignment film may be any one so long as it has a function of aligning the liquid crystal. It may, for example, be an organic material such as polyimide, polyamide, polyvinyl alcohol, polyvinyl cinnamate or polystyrene, or an inorganic material such as $SiO_2$ or $Al_2O_3$. The alignment treatment may, specifically, be carried out by e.g. a rubbing method. For example, by rubbing a surface of the alignment film in one direction by using a rubbing cloth made of nylon or rayon, it is possible to make liquid crystal molecules align in the direction. Further, other than the rubbing method, it is possible to uniformly align liquid crystal molecules by oblique vapor deposition of SiO, an ion beam method, a photoalignment film, etc.

Next, a polymer liquid crystal is formed on the alignment film. Besides the above transparent substrate (hereinafter referred to as first substrate), a second substrate having a surface on which an alignment film is formed is prepared. This alignment film may be formed in the same manner as one for the first substrate. Next, a mold-releasing treatment is applied on a surface of the second substrate on which the alignment film is formed. The mold-releasing agent may, for example, be a fluoropolymer of fluorosilane type or a fluoropolymer having a fluoroalicyclic structure. Next, on this second substrate, the first substrate is overlayed and they are preliminarily bonded so that a gap is present between them. The overlay is made so that the surface of the second substrate on which the mold-releasing treatment is applied and the surface of the first substrate on which the alignment film is formed, face to the inside to each other. Further, an opening capable of injecting the polymerizable liquid crystal composition from the outside is provided in advance. Next, through the opening, the polymerizable liquid crystal composition of the present invention is injected between the substrates. This injection may be carried out by a vacuum injection method or a method using a capillary phenomena in the atmospheric air. After the injection of the polymerizable liquid crystal composition, the polymerizable liquid crystal composition is polymerized by radiating light having a predetermined wavelength. As the case requires, a heating treatment may be applied after the radiation of light. Thereafter, by removing the second substrate that has been preliminarily bonded, a structure in which an alignment film and a polymer liquid crystal are formed on the first substrate can be obtained. In this embodiment, the polymerizable liquid crystal composition is aligned in a direction substantially parallel with the surface of the first substrate, and the polymer liquid crystal in a state that such an alignment is fixed is obtained.

Further, formation of the polymer liquid crystal may, for example, also be carried out in the following procedure.

First, a first substrate on which an alignment film is formed and a second substrate on which an alignment film is formed and further a mold-releasing agent is applied, are prepared. Next, on the alignment film formed on the first substrate, the polymerizable liquid crystal composition of the present invention is dropped. Thereafter, the second substrate is overlayed on the first substrate so that the surface of the second substrate on which the mold-releasing agent is applied faces to the polymerizable liquid crystal composition. Next, light having a predetermined wavelength is radiated to the polymerizable liquid crystal composition to polymerize the composition. Thereafter, by removing the second substrate, a structure in which the alignment film and the polymer liquid crystal are formed on the first substrate can be obtained in the same manner as above.

The polymer liquid crystal obtainable by the polymerizable liquid crystal composition of the present invention may be employed as a material of an optical element. In the above explanation, only the alignment film is mentioned to simplify the explanation, but it is possible to provide an electrode for the purpose of controlling optical properties, or it is possible to provide a reflective film for the purpose of using the optical element as a reflection type element. Further, depending on the purpose, it is possible to provide a Fresnel lens structure, a grating for diffraction grating, a colored layer for color tone adjustment or a low reflective layer for suppressing stray light etc. on a surface of the substrate.

By employing the above polymer liquid crystal, it is possible to produce a diffraction element, a phase difference plate or a wavefront correction element, etc. For example, it is possible to produce a diffraction element wherein a first member made of a first material containing the polymer liquid crystal obtainable from the polymerizable liquid crystal composition of the present invention, and a second member made of a second material having an isotropic refractive index, are alternately arranged to form a grating shape. By alternately arranging the first member and the second member, light beams passing through the respective members interfere each other to cause diffraction. In the present invention, since the first member is a polymer liquid crystal, when such a first member and isotropic second member are alternately arranged, light beams passing through the respective members cause a diffraction that changes depending on the polarizing direction of incident light. Accordingly, a diffraction grating having polarization dependence is constituted.

In the above example, as a method of shaping the first material into a grating shape to be the first member, a plasma etching is usually employed. Here, since the polymerizable liquid crystal composition of the present invention can increase the crosslinking density while maintaining liquid crystallinity, a polymer liquid crystal obtained from the composition becomes a material excellent in durability against light. Accordingly, a damage of the polymer liquid crystal at a time of plasma-etching the first material becomes small as compared with the damage of a material not employing the polymerizable liquid crystal composition of the present invention.

Here, application of the optical element of the present invention is not limited to optical head devices, but it may be applied to e.g. imaging elements in projector application or elements to be employed as a communication devices for e.g. wavelength variable filter application.

The optical element having the polymer liquid crystal obtained by polymerizing the polymerizable liquid crystal composition of the present invention, is suitable to be employed for an optical information writing/reading device for recording an information in an optical recording medium and/or for reading an information recorded in the optical recording medium. Specifically, the optical element of the present invention is suitably disposed in an optical path of laser beam in an information writing/reading device. Particularly, the element is suitable for an optical head for an optical information writing/reading device for BD or HDDVD using a blue laser beam.

For example, in an optical information writing/reading device employing the above diffraction grating, light reflected from an optical recording medium is diffracted by the diffraction grating. Here, the optical information writing/reading device may have, besides the diffraction grating, a light source for emitting light to be incident into the diffraction grating, an objective lens for condensing light emitted from the light source on the optical recording medium, a detector for detecting light reflected from the optical recording medium, etc.

FIG. 1 shows an example of the information writing/reading device of the present invention. In FIG. 1, light emitted from a light source 1 is transmitted through a diffraction grating 2, and condensed on an optical disk 4 by an objective lens 3. Subsequently, light reflected by the optical disk 4 is transmitted again through the objective lens 3, diffracted by the diffraction element 2, and reach a photodetector 5. As the light source 1, a normal laser light source to be used for normal optical information writing/reading device is employed. Specifically, a semiconductor laser is suitable, but it may be another type of laser. The diffraction grating of the present invention has a good durability against blue laser, and accordingly, by employing a blue laser as a light source, it is possible to increase the capacity of the optical information writing/reading device. In FIG. 1, the diffraction grating 2 functions as a hologram beam splitter. Further, by inserting a quarter wavelength plate 6 between the diffraction grating 2 and the optical disk 4, it is possible to rotate the polarization direction of linearly polarized light emitted from the light source 1 by 90° between the outgoing path and the returning path. By this construction, it is possible to increase the transmittance of the diffraction grating 2 for light having a polarization direction of the outgoing path, and to increase the diffraction efficiency of the diffraction grating 2 for light having a polarization direction of the returning path, and accordingly, it is possible to further increase the light utilization efficiency of the entire optical information writing/reading device.

Here, the present invention is not limited to the above embodiments, but it may be carried out as it is variously modified within a range not departing from the gist of the present invention.

Now, Examples of the present invention and Comparative Examples will be described.

Example 1

Synthesis of Compound (1A)

First, trans-4-(4-(6-hydroxyhexyloxy)phenyl)cyclohexanol (compound 1A-1) was synthesized according to the following equation.

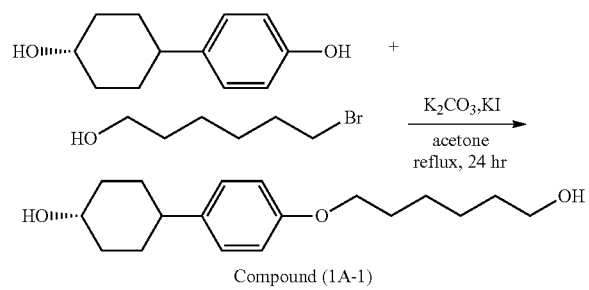

Compound (1A-1)

In a 300 ml eggplant-shaped flask, 5 g (0.026 mol) of trans-(4-hydroxycyclohexyl)phenol, 20 g (0.13 mol) of potassium carbonate, 0.86 g (0.0052 mol) of potassium iodide, 100 ml of acetone and 7.06 g (0.039 mol) of 6-bromohexanol were put, and such a mixture was stirred for 24 hours in a state that it was refluxed with heating. After completion of reaction, a reacted solvent from which solid content was filtered out was distilled by a rotary evaporator. Further, a solid content separated by the distillation was rinsed twice with 50 ml of diethyl ether to obtain 4.51 g of a white solid compound (1A-1). The yield was 59%.

Next, by using the compound (1A-1), a compound (1A) was synthesized according to the following equation.

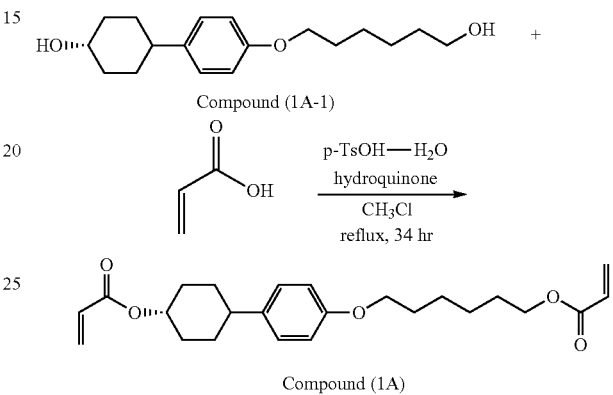

Compound (1A)

In a nitrogen atmosphere, a reflux tube, a dropping funnel and a cylinder filled with molecular sieve 4 Å were attached to a 300 ml three-port flask, 4.51 g (0.0154 mol) of compound (1A-1), 0.76 g (0.004 mol) of paratoluene sulfonic acid monohydrate, 0.63 g (0.0057 mol) of hydroquinone and 100 ml of chloroform were put into the flask, and 5.56 g (0.771 mol) of acrylic acid was dropped at room temperature. Thereafter, such a mixture was stirred for 34 hours in a state that they were refluxed with heating. 200 ml of saturated saline water was added to a mixture after the stirring, and an extraction was carried out with 100 ml of dichloromethane. An organic layer obtained by the extraction was dried by using sodium sulfonate anhydride, a solvent was removed by distillation by a rotary evaporator, and the rest of the organic layer was purified by a silica gel column chromatography (development solvent: hexane/ethyl acetate=8:1). As a result, 2.91 g of liquid crystal compound (1A) was obtained with a yield of 47%. Further, the compound was recrystallized by using dichloromethane and hexane, and as a result, 1.7 g of a white solid content was obtained. The yield was 27%. The melting point of the compound (1A) was within a range of from 53.4 to 57° C.

Compound (1A) was identified by 1H-NMR.

1H-NMR (400 MHz, CDCl$_3$): δ=1.40-1.60 (m, 8H, —CH$_2$—), 1.69-1.80 (m, 4H, —CH$_2$—), 1.90-2.0 (m, 2H, —CH$_2$—), 2.10-2.20 (m, 2H, —CH$_2$—), 2.49 (m, 1H, Ar—CH), 3.93 (t, 2H, J=6.6 Hz, —O—CH$_2$—), 4.17 (t, 2H, J=6.6 Hz, —O—CH$_2$—), 4.80-4.90 (m, 1H, —O—CH—), 5.79-5.82 (d, 2H, J=12 Hz, acryl), 6.08-6.38 (dd, 2H, acryl), 6.37-6.44 (d, 2H, acryl), 6.82 (d, 2H, J=8.8 Hz, aromatic H), 7.10 (d, 2H, J=8.8 Hz, aromatic H)

Example 2

Synthesis of Compound (1B)

First, 2-(6-bromohexyloxy)-tetrahydro-2H-pyran (compound (1B-1)) was synthesized according to the following equation.

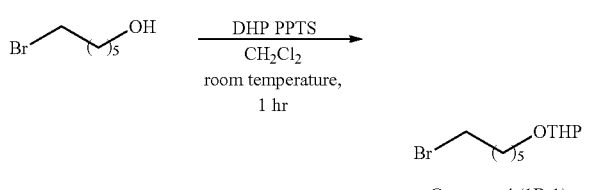

Compound (1B-1)

Into a 500 ml eggplant-shaped flask, 25 g (0.139 mol) of 6-bromohexanol, 12.83 g (0.152 mol) of dihydropyran, 1.74 g (0.007 mol) of pyridinium paratoluenesulfonate and 300 ml of dichloromethane were put, and such a mixture was stirred for 1 hour at room temperature. After reaction was completed, a reaction solvent was removed by distillation by a rotary evaporator, and 30 g of a transparent liquid of 2-(6-bromohexyloxy)-tetrahydro-2H-pyran (1B-1) was obtained by distillation. The yield was 82%.

Next, using the compound (1B-1), trans-4-(4-(6-(tetrahydro-2H-pyran-2-yloxy)hexyloxy)phenyl)cyclohexanol (1B-2) was synthesized according to the following equation.

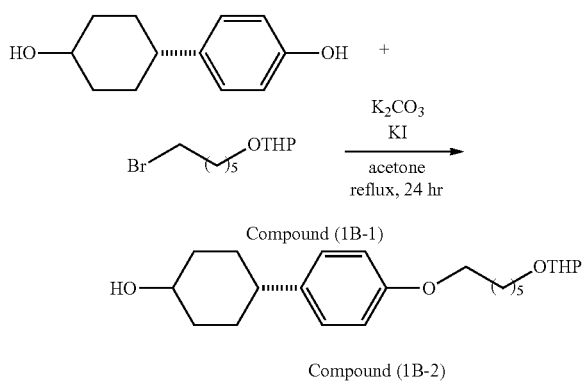

Compound (1B-2)

A reflux tube was attached to a 300 ml eggplant-shaped flask, 3 g (0.015 mol) of trans-(4-hydroxycyclohexyl)phenol, 10.8 g (0.078 mol) of potassium carbonate, 0.26 g (0.0016 mol) of potassium iodide, 50 ml of acetone and 4.97 g (0.016 mol) of compound (1B-1) were put into the flask, and such a mixture was stirred for 24 hours in a state that it was refluxed with heating. After reaction was completed, a reaction solvent from which solid state content was removed by filtering was distilled by a rotary evaporator, and the reacted product was purified by a silica gel column chromatography (development solvent:hexane/ethyl acetate=3:1). As a result, 5.6 g of compound (1B-2) was obtained as a white solid material. The yield was 95%.

Next, using the compound (1B-1) and compound (1B-2), trans-2-(6-(4-(4-(6-(tetrahydro-2H-pyran-2-yloxy)hexyloxy)phenyl)cyclohexyloxy)hexyloxy)tetrahydro-2H-pyran (1B-3) was synthesized according to the following equation.

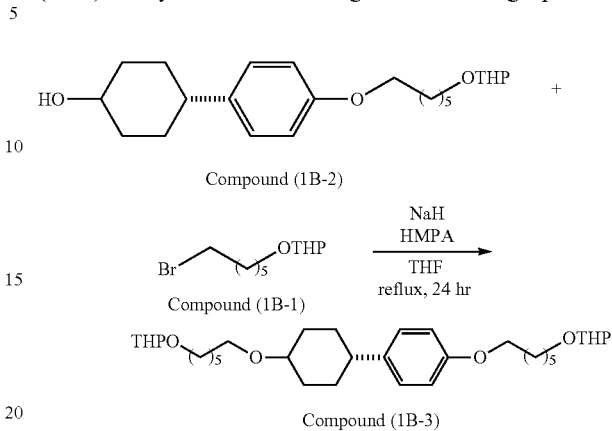

Compound (1B-3)

A reflux tube was attached to a 100 ml eggplant-shaped flask, and in a nitrogen atmosphere, 2 g (0.0053 mol) of compound (1B-2), 20 ml of tetrahydrofuran and 2 ml of hexamethyl phosphoric acid triamide were put into the flask. Further, 0.85 g (0.021 mol) of sodium hydroxide (60% assay) was gently added, and such a mixture was stirred for 30 minutes in a state that it was refluxed with heating. Thereafter, 5.07 g (0.019 mol) of compound (1B-1) was added, and they were further stirred for 24 hours in a state that they were refluxed with heating. After reaction was completed, 10 ml of a saturated ammonium chloride aqueous solution was added to the reacted mixture, and 50 ml of a saturated saline solution was added, and an extraction was carried out with 200 ml of ethyl acetate. An organic layer obtained was dried by using sodium sulfate anhydride, a solvent was removed by distillation by a rotary evaporator, and the reminder was purified by a silica gel column chromatography (development solvent: hexane/ethyl acetate/dichloromethane=4:1:0.5). As a result, 2.31 g of compound (1B-3) was obtained with an yield of 78%, Next, using the compound (1B-3), trans-6-(4-(4-(6-hydroxyhexyloxy)phenyl)cyclohexyloxy)hexan-1-ol (1B-4) was synthesized according to the following equation.

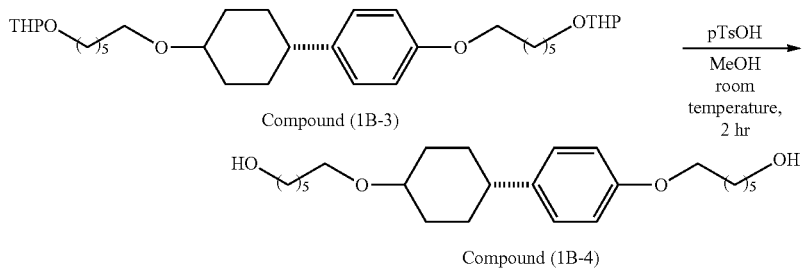

In a 100 ml eggplant-shaped flask, 2.31 g (0.0041 mol) of compound (1B-3), 20 ml of methanol and 0.08 g (0.0004 mol) of paratoluene sulfonic acid monohydrate were added, and such a mixture was stirred for 2 hours at room temperature.

After reaction was completed, a few drops of saturated sodium hydrogencarbonate aqueous solution was dropped, reaction solvent was removed by distillation by a rotary evaporator, and the reminder was purified by a silica gel column chromatography (development solvent:hexane/ethyl acetate=1:1). As a result, 1.19 g of compound (1B-4) was obtained with an yield of 74%.

Next, using the compound B4, a compound (1B) was synthesized according to the following equation.

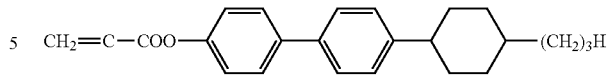

Compound (4-1)

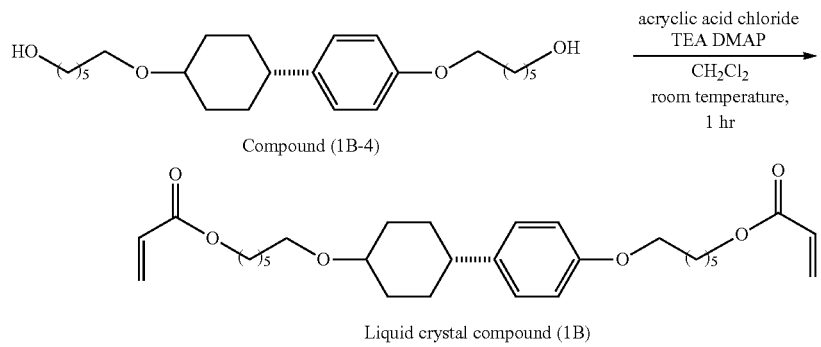

1.19 g (0.00303 mol) of compound (1B-4), 0.04 g (0.0003 mol) of 4-dimethylaminopyridine, 20 ml of dichloromethane and 0.67 g (0.0067 mol) of triethylamine were added, 0.6 g (0.0067 mol) of acrylic acid chloride was slowly dropped at 0° C., and they were stirred for 1 hour at room temperature. To such a stirred mixture, 50 ml of a saturated saline solution was added, and extraction was carried out with 100 ml of dichloromethane. An organic layer obtained was dried with sodium sulfate anhydride, the solvent was removed by distillation by a rotary evaporator, and the reminder was purified by a silica gel column chromatography (development solvent:hexane/ethyl acetate=4:1). As a result, 1.3 g of a transparent oil-like compound (1B) was obtained. The yield was 86%.

The compound (1B) was identified by 1H-NMR.

1H-NMR (400 MHz, CDCl$_3$): δ=1.19-1.82 (m, 20H, —CH$_2$—), 1.90 (m, 2H, —CH$_2$—), 2.13 (m, 2H, —CH$_2$—), 2.45 (m, 1H, Ar—CH), 3.25 (m 1H, O—CH—) 3.49 (t, 2H, —O—CH$_2$—), 3.93 (t, 2H, —O—CH$_2$—), 4.10-4.20 (m, 4H, —O—CH$_2$—), 5.79-5.82 (d, 2H, acryl), 6.08-6.16 (dd, 2H, acryl), 6.37-6.44 (d, 2H, acryl), 6.82 (d, 2H, aromatic H), 7.10 (d, 2H, aromatic H)

Example 3

Preparation of Polymerizable Liquid Crystal Composition (S1)

The compounds (4-1), (4-2), (4-3) and (4-4) represented by the following formulae and the compound (1A) synthesized in Example 1 were mixed with a molar ratio of 13:13:33.4:33.4:7.2, and 0.1 mass % of a polymerization initiator (product name: IRGACURE 754, manufactured by CIBA SPECIALTY CHEMICALS K.K.), 0.3 mass % of the following compound (5-1) (a hindered amine type photostabilizer (product name: LA62, manufactured by ADEKA Corporation)), 0.4 mass % of the compound (5-2) (a hindered phenol type polymerization inhibitor (product name: AO50, manufactured by ADEKA Corporation)) were added. By this operation, a polymerizable liquid crystal composition (S1) was obtained. The ratio of compound (1A):total of compounds (4-1), (4-2), (4-3) and (4-4), is 9.1 mass %:90.9 mass %.

-continued

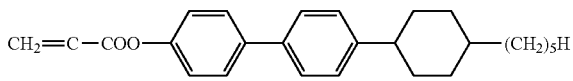

Compound (4-2)

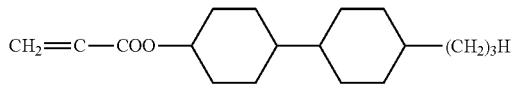

Compound (4-3)

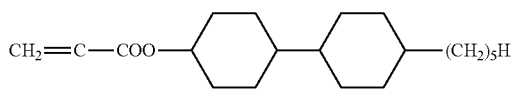

Compound (4-4)

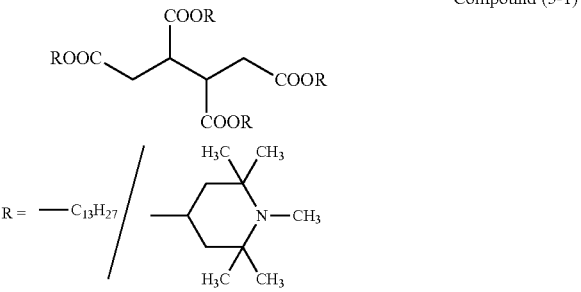

Compound (5-1)

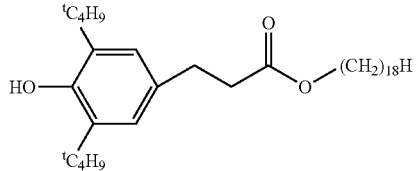

Compound (5-2)

Example 4

Preparation of Diffraction Grating (K1)

First, two glass substrates each 5 cm nigh, 5 cm wide and 0.5 mm thick were prepared, and a polyimide solution was applied on each glass substrate by a spin coater, and dried. Then, to each of polyimide films obtained, a rubbing treatment in a predetermined direction was applied by using a nylon cloth to form an alignment film. Next, a mold-releasing agent was applied on the alignment film of one of the glass substrates, and the substrate was laminated on the other glass substrate via an epoxy type sealing agent, to form a cell. The lamination was carried out so that the faces of the substrates on which alignment films were formed face to the inside to each other, and that the directions of alignment treatments of the respective glass substrates became the same. Further, glass beads having a diameter of 3.5 μm were spread between the glass substrates so that the distance between them became 3.5 μm.

Into the cell obtained above, the polymerizable liquid crystal composition (S1) of Example 3 was injected at a temperature of 60° C. Next, at a temperature of 60° C., UV rays having an intensity of 45 mW/cm$^2$ was radiated to the polymerizable liquid crystal composition (S1) so that the integrated light amount became 11,000 mJ/cm$^2$ to photopolymerize the composition. Thereafter, by using a hotplate, a heat treatment at 145° C. for 60 minutes was carried out. By this step, a polymer liquid crystal film (P1) was obtained. The polymer liquid crystal film (P1) has an ordinary refractive index $n_o$ of 1.546 and an extraordinary refractive index: $n_e$ of 1.578 for light having a wavelength of 404 nm.

Next, the glass substrate on which the mold-releasing agent was applied was removed from the cell, and a chromium film was formed on the polymer liquid crystal film (P1) exposed to the outside, by a sputtering method. Thereafter, a resist film was provided on the chromium film, and the resist film was processed into a predetermined shape by a photolithography method. Subsequently, by using the resist film as a mask, the chromium film was wet-etched by using a ceric ammonium nitrate solution, and the polymer liquid crystal film (P1) was reactive-ion-etched so that the film has a rectangular-grating-shaped cross-section. Here, the pitch of the grating was set to be 6 μm.

Next, on the polymer liquid crystal film (P1), an isotropic filler was put so that the gaps of the grating were filled with the medium. Here, the isotropic filler contains two types of photopolymerizable acrylic monomers so that the refractive index after polymerization becomes substantially equal to the ordinary refractive index $n_o$ of the polymer liquid crystal film. Then, one glass substrate of 5 cm high, 5 cm wide and 0.5 mm thick was further prepared, and the glass substrate was placed on the isotropic filler on the polymer liquid crystal film (P1), so that the polymer liquid crystal film (P1) and the isotropic filler were sandwiched between two glass substrates. Thereafter, UV rays having an intensity of 3,000 mW/cm$^2$ was radiated so that the integrated light amount became 3,500 mJ/cm$^2$, to solidify the isotropic filler by photopolymerization, and such a laminate was cut into a size of 2 cm high and 2 cm wide by using a dicer. By the above process, a diffraction grating (K1) was obtained.

Comparative Example 1

Preparation of Polymerizable Liquid Crystal Composition (S2)

The compounds (4-1), (4-2), (4-3) and (4-4) described in Example 3 were mixed at a molar ratio of 14:14:36:36, and 0.1 mass % of a polymerization initiator (product name: IRGACURE 754 manufactured by CIBA SPECIALTY CHEMICALS K.K.), 0.3 mass % of the following compound (5-3) (a hindered amine type photostabilizer (product name: Tinuvin123, manufactured by ADEKA Corporation), and 0.4 mass % of the compound (5-2) (a hindered phenol type polymerization inhibitor (product name: AO50 manufactured by ADEKA Corporation)) described in Example 3, were added. By this operation, a polymerizable liquid crystal composition (S2) was obtained.

Compound (5-3)

$$H(H_2C)_8O-N\begin{matrix}H_3C & CH_3\\ \\ H_3C & CH_3\end{matrix}-OOC(CH_2)_8COO-\begin{matrix}H_3C & CH_3\\ \\ H_3C & CH_3\end{matrix}N-O(CH_2)_8H$$

Comparative Example 2

Preparation of Diffraction Grating (K2)

Into a cell prepared in the same manner as Example 4, the polymerizable liquid crystal composition (S2) synthesized in Comparative Example 1 was injected at a temperature of 70° C. Subsequently, at a temperature of 66° C., UV rays having an intensity of 45 mW/cm$^2$ was radiated so that the integrated light amount became 8,100 mJ/cm$^2$, to photopolymerize the polymerizable liquid crystal composition (S2). Thereafter, by using a hotplate, a heating treatment at 145° C. for 15 minutes was carried out. By this process, a polymer liquid crystal film (P2) was obtained.

Next, in the same manner as Example 4, a reactive ion etching of the polymer liquid crystal film (P2) was carried out, to process the film to have a rectangular grating-shaped cross section. Here, the pitch of the grating was 6 μm.

Next, on the polymer liquid crystal film (P2), an isotropic filler was placed so that the gaps of the grating were filled with the medium. Then, one glass substrate of 5 cm high, 5 cm wide and 0.5 mm thick was further prepared, and the glass substrate was placed on the isotropic filler, so that the polymer liquid crystal film and the isotropic filler were sandwiched between two glass substrates. Thereafter, UV rays having an intensity of 3,000 mW/cm$^2$ was radiated so that the integrated light amount became 3,500 mJ/cm$^2$, to solidify the isotropic filler by photopolymerization, and such a laminate was cut into a size of 1 cm high and 1 cm wide by using a dicer. By the above process, a diffraction grating (K2) was obtained.

<Evaluation of Diffraction Gratings (K1) and (K2)>

Into the diffraction grating (K1) prepared in Example 4 and the diffraction grating (K2) prepared in Comparative Example 2, a Kr laser beam (multimodes of wavelengths 407 and 413 nm) was perpendicularly incident by using a Kr laser apparatus (product name: Inova 302, manufactured by Coherent Inc.) so that the polarization direction was set to maximize diffraction. Here, the temperature at the experiment was set to be 80° C., and the integrated light amount was set to be from 10 to 60 Wh/mm$^2$.

Table 1 shows the change of total light amount per unit phase difference of each of the diffraction gratings (K1) and (K2) when they are exposed to integrated light amount of from 10 Wh/mm² to 60 Wh/mm². Here, the total light amount is the sum total of 0-th order light (transmission light) and 1-st order light (diffracted light).

TABLE 1

| | | Integrated light amount (Wh/mm²) | | | | |
|---|---|---|---|---|---|---|
| | | 10 | 20 | 30 | 50 | 60 |
| Change of total light amount (%) | Diffraction grating (K1) (Ex. 4) | 0.4 | −0.2 | −0.5 | 0.1 | −3.0 |
| | Diffraction grating (K2) (Comp. Ex. 2) | 0.8 | −3.0 | −4.6 | Not measured | Not measured |

As understandable from Table 1, in the diffraction grating (K1) of the present invention, the total light amount shows little change until an integrated light amount of 50 Wh/mm², and the total light amount starts to decrease around an integrated light amount of 60 Wh/mm². On the other hand, in the diffraction grating (K2) of Comparative Example, there is no significant change of the integrated light amount until an integrated light amount of 10 Wh/mm², but the total light amount starts to decrease around an integrated light amount of 20 Wh/mm². From these results, it has been understood that a diffraction grating excellent in the durability against light can be obtained by the present invention. It is possible to obtain a diffraction grating in the same manner as Example 4 by preparing a polymerizable liquid crystal composition wherein the compound (1A) employed in Example 3 is replaced by the compound (1B), and employing such a polymerizable liquid crystal composition.

INDUSTRIAL APPLICABILITY

The compound of the present invention shows a high durability against blue light, and desired liquid crystallinity can be easily obtained by using the compound for a polymerizable liquid crystal composition. Accordingly, the compound of the present invention can be suitably employed for applications such as various types of optical elements, particularly, applications requiring a high refractive index material such as optical disks using a strong blue light or optical elements. Further, the optical element can be used as e.g. diffraction gratings, hologram elements, lens elements, aberration correction elements or phase difference plates, and particularly, the optical element is suitable for optical head devices using a blue laser beam.

The entire disclosure of Japanese Patent Application No. 2008-142147 filed on May 30, 2008 including specification, claims, drawings and summary is incorporated herein by reference in its entirety.

EXPLANATION OF NUMERALS

| 1: | Light source |
|---|---|
| 2: | Diffraction grating |
| 3: | Objective lens |
| 4: | Optical disk |
| 5: | Photodetector |
| 6: | Quarter wavelength plate |

What is claimed is:

1. A compound represented by the following formula (1):

$$CH_2=CR^1—COO—R^2\text{-Cy-Ph-}R^3—OCO—CR^4=CH_2 \quad (1)$$

wherein $R^1$ and $R^4$ are each independently represents a hydrogen atom or a methyl group;
  $R^2$ represents a single bond or a $C_{1-15}$ alkylene group wherein an oxygen atom is present at an end of the group to be bonded to a cyclic group;
  $R^3$ represents a $C_{1-15}$ alkylene group wherein an oxygen atom is present or not present at an end of the group to be bonded to a cyclic group;
  except in a case where $R^2$ is a single bond, $R^2$ and/or $R^3$ may each independently have an etheric oxygen atom it a carbon-carbon bond in the alkylene group, and some or all of hydrogen atoms bonded to carbon atoms of the group may be substituted by fluorine atoms;
  Cy represents a trans-1,4-cyclohexylene group wherein hydrogen atoms bonded to carbon atoms in the group may be each independently substituted by a fluorine atom, a chlorine atom or a methyl group; and
  Ph represents a 1,4-phenylene group wherein hydrogen atoms bonded to carbon atoms in the group may be each independently substituted by a fluorine atom, a chlorine atom or a methyl group.

2. The compound according to claim 1, wherein $R^2$ is a single bond.

3. The compound according to claim 1, wherein $R^1$ and $R^4$ are each a hydrogen atom; and
  $R^3$ is an alkylene group wherein some or all of hydrogen atoms bonded to carbon atoms in the alkylene group may be substituted by fluorine atoms, or an alkylene group wherein an oxygen atom is present at an end of the group to be bonded to a cyclic group.

4. A polymerizable liquid crystal composition containing the compound as defined in claim 1 and a polymerizable liquid crystal compound other than the compound.

5. The polymerizable liquid crystal composition according to claim 4, wherein the composition contains from 1 mass % to 30 mass % of the compound as defined in formula (1), and contains from 1 mass % to 30 mass % in total of all crosslinking compounds including other crosslinking compounds, and the composition contains from 70 mass % to 99 mass % of the non-crosslinking compound represented by the following formula (2):

$$CH_2=CR^5—COO—R^6\text{-}A^1\text{-}Y^1/A^2\text{-}A^3\text{-}A^4\text{-}R^7 \quad (2)$$

wherein $R^5$ represents a hydrogen atom or a methyl group;
  $R^6$ represents a single bond or a $C_{1-15}$ alkylene group, and when $R^6$ is an alkylene group, an etheric oxygen atom may be present independently in a carbon-carbon bond of the alkylene group or at an end of the group to be bonded to a cyclic group, and some or all of hydrogen atoms bonded to carbon atoms of the group may be substituted by fluorine atoms;
  $R^7$ is a $C_{1-12}$ alkyl group, a $C_{1-12}$ alkoxy group, a $C_{1-12}$ alkylcarbonyloxy group or a fluorine atom, and when $R^7$ is an alkyl group, an alkoxy group or an alkylcarbonyloxy group, some or all hydrogen atoms bonded to carbon atoms in the group may be substituted by fluorine atoms;
  $Y^1$ represents a single bond or —COO—; and
  $A^1$, $A^2$, $A^3$ and $A^4$ each independently represents a single bond, a trans-1,4-cyclohexylene group or a 1,4-phenylene group, at most two of $A^1, A^2, A^3$ and $A^4$ represent single bonds, at least one of them represents a trans-1, 4-cyclohexylene group, there is no three continuous 1,4-phenylene groups, and some or all of hydrogen atoms of the trans-1,4-cyclohexylene group or the 1,4-phenylene group may be substituted by fluorine atoms.

6. An optical element employing a polymer liquid crystal obtained by polymerizing the polymerizable liquid crystal composition as defined in claim 4.

7. An optical writing/reading device for recording an information in an optical recording medium and/or for reading an information recorded in an information recording medium, which employs the optical element as defined in claim 6.

8. The optical information writing/reading device according to claim 7, which employs a blue laser as a light source.

* * * * *